(12) United States Patent
Mittelman

(10) Patent No.: US 11,539,622 B2
(45) Date of Patent: Dec. 27, 2022

(54) DYNAMICALLY-OPTIMIZED HASH-BASED PACKET CLASSIFIER

(71) Applicant: Mellanox Technologies, Ltd., Yokneam (IL)

(72) Inventor: Guy Mittelman, Meitar (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/865,560

(22) Filed: May 4, 2020

(65) Prior Publication Data
US 2021/0344596 A1   Nov. 4, 2021

(51) Int. Cl.
| | | |
|---|---|---|
| H04L 45/745 | (2022.01) | |
| H04L 45/74 | (2022.01) | |
| H04L 69/22 | (2022.01) | |
| H04L 45/7453 | (2022.01) | |

(52) U.S. Cl.
CPC ........ *H04L 45/742* (2013.01); *H04L 45/7453* (2013.01); *H04L 45/74591* (2022.05); *H04L 69/22* (2013.01)

(58) Field of Classification Search
None
See application file for complete search history.

(56) References Cited

U.S. PATENT DOCUMENTS

| | | | |
|---|---|---|---|
| 5,537,514 A * | 7/1996 | Nishidai | G06N 5/048 706/900 |
| 6,611,875 B1 | 8/2003 | Chopra et al. | |
| 6,957,215 B2 | 10/2005 | Stark | |
| 7,051,078 B1 | 5/2006 | Cheriton | |
| 7,054,315 B2 | 5/2006 | Liao | |
| 7,061,874 B2 | 6/2006 | Merugu et al. | |
| 7,116,663 B2 | 10/2006 | Liao | |
| 7,234,019 B1 | 6/2007 | Kao et al. | |
| 7,366,830 B1 | 4/2008 | Maheshwari | |
| 7,394,809 B2 | 7/2008 | Kumar et al. | |
| 7,426,518 B2 | 9/2008 | Venkatachary et al. | |
| 7,804,699 B2 | 9/2010 | Gupta et al. | |
| 7,933,282 B1 | 4/2011 | Gupta et al. | |
| 8,271,564 B2 | 9/2012 | Dade et al. | |

(Continued)

OTHER PUBLICATIONS

U.S. Appl. No. 16/132,549 Office Action dated Oct. 28, 2020.
(Continued)

*Primary Examiner* — The Hy Nguyen
(74) *Attorney, Agent, or Firm* — Kligler & Associates Patent Attorneys Ltd

(57) ABSTRACT

A network element includes multiple ports and a packet classifier. The packet classifier is configured to receive rules and Rule Patterns (RPs), each RP corresponding to a subset of the rules and specifies positions of unmasked packet-header bits to be matched by the rules in the subset, to store in a RAM a grouping of the RPs into Extended RPs (ERPs), each ERP defining a superset of the unmasked bits in the RPs associated therewith, to receive packets and match each packet to one or more of the rules by accessing the ERPs in the RAM, to determine counter values, each counter value corresponding to a respective RP and is indicative of a number of the received packets that match the RP, and to adaptively modify grouping of the RPs into the ERPs depending on the counter values.

18 Claims, 3 Drawing Sheets

200
202 REGION 1 | 206 REGION 2

| ERP #1 xxxx.xxxx.1111.1111 | Hit number | ERP #2 1111.1111.xxxx.xxxx | Hit number |
|---|---|---|---|
| 1111.1110.1111.1111  204A | 100 | 1111.1111.0111.1111  204E | 100 |
| 0111.1111.1111.1111  204B | 1 | | |
| 0011.1111.1111.1111  204C | 1 | | |
| 0001.1111.1111.1111  204D | 1 | | |
| Total hits | 103 | Total hits | 100 |
| Total RAM access cycles | 103 | Total RAM access cycles | 200 |

208
210 REGION 1 | 202 REGION 2

| ERP #3 1111.xxxx.xxxx.1111 | Hit number | ERP #1 xxxx.xxxx.1111.1111 | Hit number |
|---|---|---|---|
| 1111.1110.1111.1111  204A | 100 | 0111.1111.1111.1111  204B | 1 |
| 1111.1111.0111.1111  204E | 100 | 0011.1111.1111.1111  204C | 1 |
| | | 0001.1111.1111.1111  204D | 1 |
| Total hits | 200 | Total hits | 3 |
| Total RAM access cycles | 200 | Total RAM access cycles | 6 |

(56) References Cited

U.S. PATENT DOCUMENTS

| | | | |
|---|---|---|---|
| 8,290,934 | B2 | 10/2012 | Stergiou et al. |
| 8,305,271 | B2 | 11/2012 | Li et al. |
| 8,462,786 | B2 | 6/2013 | Liu et al. |
| 8,468,296 | B1 | 6/2013 | Cohen |
| 8,619,766 | B2 | 12/2013 | Wang et al. |
| 8,856,203 | B1 | 10/2014 | Schelp et al. |
| 8,861,347 | B2 | 10/2014 | Bloch et al. |
| 8,938,469 | B1 | 1/2015 | Keen et al. |
| 9,087,586 | B2 | 7/2015 | Bosshart |
| 9,098,601 | B2 | 8/2015 | Wang |
| 9,111,615 | B1 | 8/2015 | Jiang |
| 9,171,030 | B1 | 10/2015 | Arad et al. |
| 9,223,711 | B2 | 12/2015 | Philip et al. |
| 9,245,626 | B2 | 1/2016 | Fingerhut et al. |
| 9,262,312 | B1 | 2/2016 | Gazit et al. |
| 9,317,517 | B2 | 4/2016 | Attaluri et al. |
| 9,344,366 | B2 | 5/2016 | Bouchard et al. |
| 9,406,381 | B2 | 8/2016 | Akerib et al. |
| 9,411,908 | B2 | 8/2016 | Valency et al. |
| 9,424,366 | B1 | 8/2016 | Gazit et al. |
| 9,438,505 | B1 | 9/2016 | Zhou et al. |
| 9,543,015 | B1 | 1/2017 | Roy |
| 9,569,561 | B2 | 2/2017 | Wildman et al. |
| 9,627,063 | B2 | 4/2017 | Dharmapurikar |
| 9,659,046 | B2 | 5/2017 | Sen et al. |
| 9,672,239 | B1 | 6/2017 | Rottenstreich et al. |
| 9,704,574 | B1 | 7/2017 | Shamis |
| 9,779,123 | B2 | 10/2017 | Sen et al. |
| 9,785,666 | B2 | 10/2017 | Li et al. |
| 9,866,479 | B2 | 1/2018 | Wang et al. |
| 9,892,057 | B2 | 2/2018 | Levy et al. |
| 9,984,144 | B2 | 5/2018 | Levy et al. |
| 10,049,126 | B2 | 8/2018 | Levy et al. |
| 10,068,034 | B2 | 9/2018 | Levy et al. |
| 10,097,378 | B2 | 10/2018 | Dong et al. |
| 2002/0089937 | A1 | 7/2002 | Venkatachary et al. |
| 2002/0154636 | A1* | 10/2002 | Thomas .............. H04L 63/0428 370/392 |
| 2003/0051165 | A1* | 3/2003 | Krishnan ............ H04L 63/0263 726/4 |
| 2003/0123459 | A1 | 7/2003 | Liao |
| 2004/0100950 | A1 | 5/2004 | Basu et al. |
| 2005/0147113 | A1 | 7/2005 | Brown |
| 2006/0209725 | A1 | 9/2006 | Cadambi et al. |
| 2008/0192754 | A1 | 8/2008 | Ku et al. |
| 2008/0215518 | A1* | 9/2008 | Matsuda ................. H04L 63/02 706/47 |
| 2008/0228691 | A1 | 9/2008 | Shavit et al. |
| 2008/0259667 | A1 | 10/2008 | Wickeraad |
| 2009/0097654 | A1 | 4/2009 | Blake |
| 2010/0080223 | A1 | 4/2010 | Wong et al. |
| 2010/0269024 | A1 | 10/2010 | Hao et al. |
| 2012/0054467 | A1 | 3/2012 | Fulton et al. |
| 2012/0137060 | A1 | 5/2012 | Akerib et al. |
| 2012/0275466 | A1 | 11/2012 | Bhadra et al. |
| 2013/0311492 | A1 | 11/2013 | Calvignac et al. |
| 2014/0006706 | A1 | 1/2014 | Wang |
| 2014/0089498 | A1 | 3/2014 | Goldfarb et al. |
| 2014/0201307 | A1 | 7/2014 | Banavalikar et al. |
| 2014/0215144 | A1 | 7/2014 | Valency et al. |
| 2014/0310307 | A1 | 10/2014 | Levy et al. |
| 2015/0058595 | A1 | 2/2015 | Gura et al. |
| 2015/0127900 | A1 | 5/2015 | Dharmapurikar et al. |
| 2015/0207735 | A1 | 7/2015 | Kuramoto |
| 2015/0242429 | A1 | 8/2015 | Varvello et al. |
| 2015/0244842 | A1 | 8/2015 | Laufer et al. |
| 2016/0202932 | A1 | 7/2016 | Kadu |
| 2016/0294625 | A1 | 10/2016 | Mahkonen et al. |
| 2017/0046395 | A1 | 2/2017 | Li et al. |
| 2017/0052731 | A1* | 2/2017 | Levy ..................... G06F 16/285 |
| 2017/0053012 | A1 | 2/2017 | Levy et al. |
| 2017/0147254 | A1 | 5/2017 | Adams et al. |
| 2017/0195253 | A1 | 7/2017 | Annaluru et al. |
| 2017/0346765 | A1 | 11/2017 | Immidi |
| 2018/0068032 | A1* | 3/2018 | Levy ................... H04L 45/7453 |
| 2018/0278525 | A1 | 9/2018 | Levy et al. |
| 2018/0330412 | A1* | 11/2018 | Fredriksson .......... G06Q 30/04 |
| 2019/0036821 | A1* | 1/2019 | Levy ................... G06F 12/0868 |
| 2019/0042304 | A1* | 2/2019 | Wang ................. H04L 47/2441 |
| 2020/0089816 | A1 | 3/2020 | Shattah |

OTHER PUBLICATIONS

U.S. Appl. No. 16/559,658 Office Action dated Nov. 25, 2020.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 1, pp. 1543-1561, Sep. 2009.

Patrow, A., "General Purpose Hash Function Algorithms", 6 pages, year 2000 http://www.partow.net/programming/hashfunctions/.

Laurence et al., "Spam Based Architecture for team for Low Area and Less Power Consumption", ARPN Journal of Engineering and Applied Sciences, vol. 10, No. 17, pp. 7607-7612, Sep. 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsruhe, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

Demetriades et al., "An Efficient Hardware-based Multi-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM Sigmetrics international conference on Measurement and modeling of computer systems (Sigmetrics '08), pp. 467-468, Jun. 2-6, 2008.

Kasnavi et al., "A cache-based internet protocol address lookup architecture", Computer Networks, vol. 52, pp. 303-326, year 2008.

Matousek, et al., "ClassBench-ng: Recasting ClassBench After a Decade of Network Evolution", Proceedings of the Symposium on Architectures for Networking and Communications Systems (ANCS '17), 13 pages, May 2017.

Levy et al., U.S. Appl. No. 16/052,646, filed Aug. 2, 2018.

Remen et al., U.S. Appl. No. 16/559,658, filed Sep. 4, 2019.

Pontarelli et al., "Parallel d-Pipeline: A Cuckoo Hashing Implementation for Increased Throughput", IEEE Transactions on Computers, vol. 65, No. 1, pp. 326-331, Jan. 2016.

Reviriego et al., "Energy Efficient Exact Matching for Flow Identification with Cuckoo Affinity Hashing", IEEE Communications Letters, vol. 18, No. 5, pp. 885-888, May 2014.

Pontarelli et al., "Cuckoo Cache: A Technique to Improve Flow Monitoring Throughput", IEEE Internet Computing, vol. 20, issue 4, pp. 1-11, Jul.-Aug. 2016.

Zhou et al., "Scalable, High Performance Ethernet Forwarding with Cuckooswitch", CoNEXT '13, pp. 1-12, Santa Barbara, USA, Dec. 9-12, 2013.

(56) References Cited

OTHER PUBLICATIONS

Che et al., "DRES: Dynamic Range Encoding Scheme for TCAM Coprocessors", IEEE Transactions on Computers, vol. 57, No. 7, pp. 902-915, Jul. 2008.
Liu et al., "TCAM Razor: A Systematic Approach Towards Minimizing Packet Classifiers in TCAMs", IEEE/ACM Transactions on Networking, vol. 18, No. 2, pp. 490-500, Apr. 2010.
Liu et al., "All-Match Based Complete Redundancy Removal for Packet Classifiers in TCAMs", Proceedings of IEEE 27th Conference on Computer Communications (INFOCOM 2008), pp. 574-582, Apr. 13-18, 2008.
Liu et al., "Complete Redundancy Removal for Packet Classifiers in TCAMs", IEEE Transactions on Parallel and Distributed Systems, vol. 21, No. 4, pp. 424-437, Apr. 2010.
Taylor et al., "Scalable Packet Classification using Distributed Crossproducting of Field Labels", IEEE Infocom, pp. 1-12, 2005.
U.S. Appl. No. 16/559,658 office action dated Jul. 23, 2020.
Xu et al., "A Novel Hash-based Packet Classification Algorithm," 5th International Conference on Information Communications & Signal Processing, pp. 1504-1508, Dec. 2005.
U.S. Appl. No. 16/052,646 Office Action dated Mar. 19, 2021.
Hua et al., "Variable-Stride Multi-Pattern Matching For Scalable Deep Packet Inspection", IEEE Infocom , pp. 415-423, Rio de Janeiro, Brazil, Apr. 19-25, 2009.
Bi et al., "Hierarchical trie packet classification algorithm based on expectation-maximization clustering," research article, Plos One, pp. 1-12, Jul. 13, 2017, as downloaded from https://journals.plos.org/plosone/article?id=10.1371/journal.pone.0181049.
Baboescu et al., "Scalable Packet Classification," IEEE/ACM Transactions on Networking, vol. 13, No. 1, pp. 2-14, Feb. 2005.
Kogan et al., "Strategies for Mitigating TCAM Space Bottlenecks," IEEE 22nd Annual Symposium on High-Performance Interconnects, IEEE Computer Society, pp. 25-32, year 2014.
U.S. Appl. No. 16/052,646 Office Action dated Sep. 17, 2021.
U.S. Appl. No. 17/013,697 Office Action dated Jan. 13, 2022.
U.S. Appl. No. 17/013,697 Office Action dated Jul. 12, 2022.

* cited by examiner

DYNAMICALLY-OPTIMIZED HASH-BASED PACKET CLASSIFIER

FIELD OF THE INVENTION

The present invention relates generally to communication networks, and particularly to efficient network packet classification using hash-based memories.

BACKGROUND OF THE INVENTION

In communication networks, ingress packets are typically classified to determine packet actions, such as routing and security. The actions are sometimes defined in look-up tables that are stored in memories such as Static Random-Access Memories (SRAM) and/or Ternary Content-Addressable Memories (TCAMs). When SRAMs are used, fast access techniques like hashing are sometimes employed.

Techniques to build efficient hash tables for packet classification are described, for example, by Xu et al., in "A Novel Hash-based Packet Classification Algorithm," $5^{th}$ International Conference on Information Communications & Signal Processing, December 2005.

U.S. Patent Application Publication 2018/0068032 describes a method that includes extracting classification keys from a collection of data items, receiving a corpus of rules for matching to the classification keys, each rule including a respective set of unmasked bits having corresponding bit values, and at least some of the rules also include masked bits, extracting rule patterns from the corpus, each rule pattern defining a respective sequence of masked and unmasked bits to which one or more of the rules conforms; defining Multiple hash tables in in a RAM, each is used for searching for a rule that matches a given classification key, wherein a match result of a given rule in a given hash table is also indicative of which of the other hash tables are to be used for subsequent searching, and classifying the data items by matching the respective classification keys to the rules using one or more of the hash tables.

U.S. Patent Application Publication 2017/0052731 describes a method for classification including extracting respective classification keys from a collection of data items and receiving a corpus of rules for matching to the classification keys. At least some of the rules include masked bits in addition to the unmasked bits. Rule patterns are extracted from the corpus, defining different, respective sequences of masked and unmasked bits to which one or more of the rules conform. The rule patterns are grouped into extended rule patterns, such that the respective set of unmasked bits in any rule pattern is a superset of the unmasked bits in the extended rule pattern into which it is grouped. Rule entries corresponding to the rules are computed using the extended rule patterns and are stored in a random-access memory (RAM), and the data items are classified by matching the respective classification keys to the rule entries in the RAM.

SUMMARY OF THE INVENTION

An embodiment of the present invention that is described herein provides a network element including multiple ports, a packet classifier and a packet handler. The ports are configured to transmit and receive packets over a network. The packet classifier is configured to receive a corpus of rules and a plurality of Rule Patterns (RPs), each RP corresponding to a subset of the rules and specifies positions of unmasked packet-header bits to be matched by the rules in the subset, to store in a Random-Access Memory (RAM) a grouping of the RPs into Extended RPs (ERPs), each ERP defining a superset of the unmasked bits in the RPs associated therewith, to receive packets and match each packet to one or more of the rules by accessing the ERPs in the RAM, to determine multiple counter values, each counter value corresponding to a respective RP and is indicative of a number of the received packets that match the RP, and to adaptively modify grouping of the RPs into the ERPs depending on the counter values. The packet handler is configured to apply actions to the packets depending on matching of the packets to the rules.

In some embodiments, the packet classifier is configured to increment the counter values in response to received packets that match the RPs corresponding to the counter values, and to modify the grouping of the RPs into the ERPs based on the incremented counter values. In an embodiment, in performing a given modification of the grouping of the RPs, the packet classifier is configured to reduce an average number of times the RAM is read per packet.

In a disclosed embodiment, the packet classifier is configured to store the modified grouping of the RPs into the ERPs in memory regions of the RAM that are read sequentially, so as to reduce an average number of times the RAM is read per packet. In an example embodiment, the packet classifier is configured to modify the grouping of the RPs by finding, for a given region of the RAM, an RP grouping that corresponds to a highest aggregate number of the counter values and still fits within the region.

In some embodiments, the packet classifier is configured to periodically reset the multiple counter values. In some embodiments, the network element further includes a Ternary-Content-Addressable Memory (TCAM) that is configured to hold, at least temporarily, a subset of the rules, and the classifier is configured to match a received packet to the rules stored in the TCAM upon failing to find a successful match in the RAM.

There is additionally provided, in accordance with an embodiment of the present invention, a method including, in a network element that transmits and receives packets over a network, receiving a corpus of rules and a plurality of Rule Patterns (RPs). Each RP corresponds to a subset of the rules and specifies positions of unmasked packet-header bits to be matched by the rules in the subset. A grouping of the RPs into Extended RPs (ERPs) is stored in a Random-Access Memory (RAM). Each ERP defines a superset of the unmasked bits in the RPs associated therewith. Packets are received, and each packet is matched to one or more of the rules by accessing the ERPs in the RAM. Multiple counter values are determined, each counter value corresponding to a respective RP and indicative of a number of the received packets that match the RP. The grouping of the RPs into the ERPs is adaptively modified depending on the counter values. Actions are applied to the packets depending on matching of the packets to the rules.

The present invention will be more fully understood from the following detailed description of the embodiments thereof, taken together with the drawings in which:

DETAILED DESCRIPTION OF EMBODIMENTS

Overview

Figure 1:
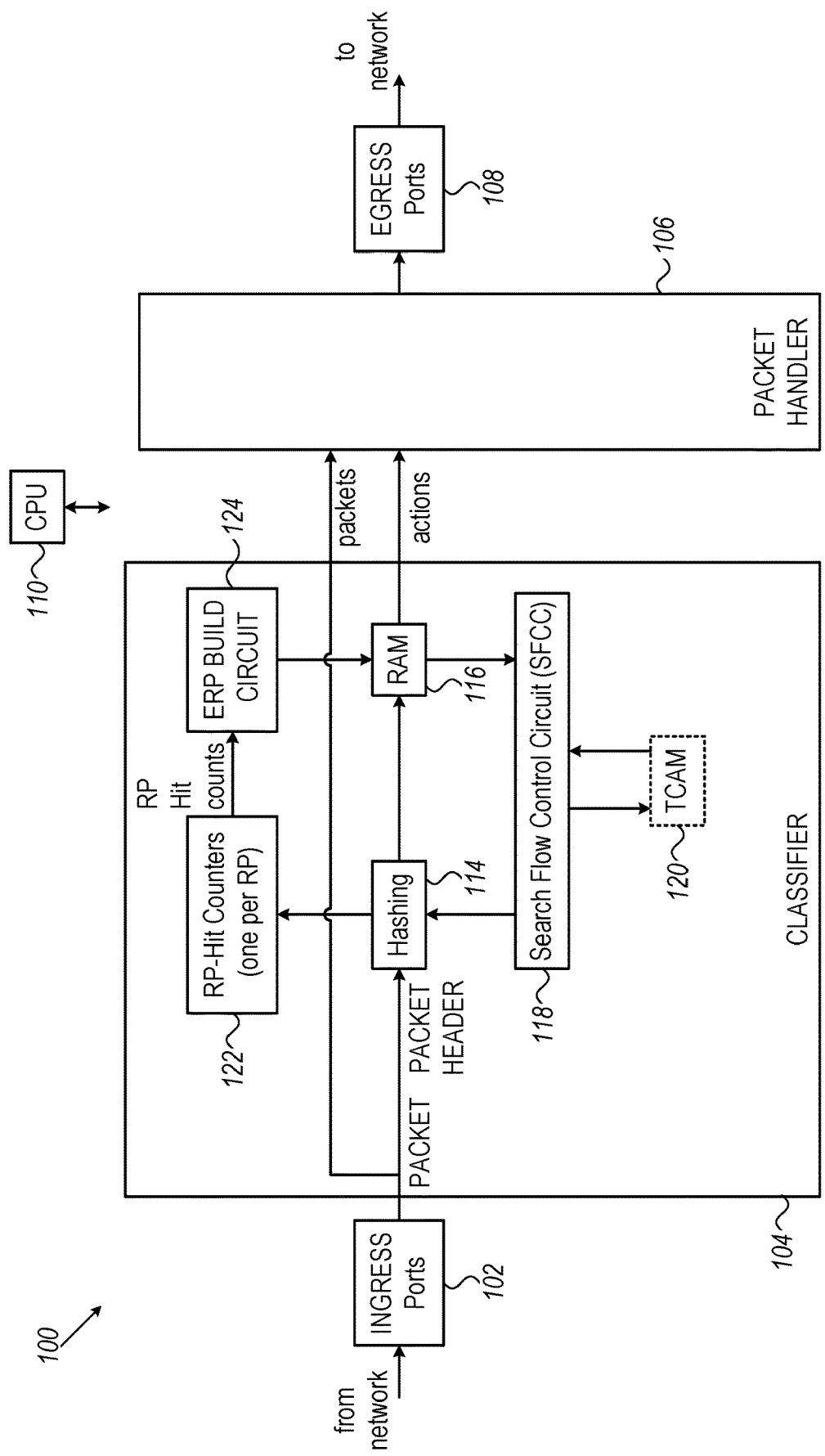
FIG. 1 is a block diagram that schematically illustrates a network element, in accordance with embodiments of the present invention.

Network elements, such as network switches/routers, receive packets from ingress ports and forward the packets to egress ports, according to forwarding/routing rules. The network element typically comprises a Packet Classifier that is configured to apply forwarding/routing rules to packets based on packet headers. The classifier may additionally apply other rules, such as security and Quality-of-Service (QoS) rules. The set of rules is sometimes called rules corpus, and the actions that the rules define is sometimes called Access Control List (ACL).

High-speed packet classification may be done by Ternary Content Addressable Memories (TCAMs) that compare a packet header and/or other packet-related inputs with a full suite of classification rules in ternary encoding, concurrently. TCAM memories, however, are typically larger (in terms of silicon area) than Static Random-Access Memory (SRAMs) or Dynamic Random-Access Memory (DRAMs), and, since a TCAM compares all entries concurrently, consume significantly more power.

Alternatively, or additionally, packet classification may be done by one or more SRAMs or DRAMs. As the number of bits in packet headers is usually far beyond the range that any RAM can handle, hashing techniques may be employed. A hash function would typically encode the packet header into a narrower hash value, which is then used to directly access a RAM entry and retrieve the action associated with a substantial part of the possible headers. If a header is not found in the RAM, packet classification may revert to accessing a TCAM, to routing by other circuitry (beyond the scope of the present invention), or to slower processing by software.

Typical packet classification rules comprise a Key and a Mask, which correspond to fields in the header and are used as an index; and, an Action, which defines the desired action that a packet processor should perform when receiving a packet with a header that fits the Key and the Mask. The Mask field defines which bits of the packet header should be ignored for the rule, whereas the Key field specifies the required values of bits which are not ignored. The mask field bits are typically designated with X, and the non-mask bits with U, (which can be 0 or 1, but not x).

For example, if a rule specifies that all packets that are received through port 0x3A must receive the highest QoS, a corresponding rule will specify all other header fields (source, destination, etc.) as X. The rule may have the form:
    XXX . . . , XXX . . . , XXX . . . , . . . , 3A→Action.

Definitions

In the descriptions hereinbelow, the following terms are used:

Corpus of Rules: The set of classification rules. A preliminary corpus of rules is usually computed, and, when packets are classified, the corpus of rules may be updated.

Rule Pattern (RP): A pattern specifying the locations of X bits in a classification rule; e.g., UUUXXUUUUXXX (note that practical RPs are much longer). An RP includes all rules that have X in indicated locations, and any other bits in other locations. For example, a 010XX1100XXX rule is covered by the RP mentioned above, and a 0100X000000X rule is not. We will refer hereinbelow to rules that are included in an RP as rules "contained," "matched" or "covered" by the RP.

Extended Rule Pattern (ERP): The merging of a group of rule patterns (RPs) to a single rule-pattern. For example, if RP1=UUUX and RP2=UUXU, then an ERP=UUXX will contain both RP1 and RP2. (Formally, in an ERP which is the merging of RP1 through RPn, each bit is U if and only if all the corresponding RPi bits are U; and X otherwise.) We will refer hereinbelow to RPs that are merged into an ERP as RPs contained by the ERP or matching the ERP.

Region: A collection of ERPs in Random-Access Memory (RAM) that can be searched in a single cycle. According to an embodiment, each region may comprise up to eight ERPs. The regions of the RAM are accessed serially until a rule id found (see below).

Hashing RAM: RAM, accessed by a hash function, and storing actions to be performed on packets if a match is found for the packet header, or, further searching guidance information if the header is not found. Hashing RAM entries may also comprise a Match-Found indicator, a Search-in-TCAM indicator and/or a Request CPU Help indicator (see below).

RAM Update: the process of periodically changing entries in the RAM, attempting to improve the classifier's performance by reducing the average packet classification time.

In some embodiments, in response to receiving a packet header, the classifier creates a hash value, using a first hashing function, and then reads the Hashing RAM using the hash value as index. This first search is confined to a first region. If the RAM contents at the hash value fits the packet header, the classifier will read the necessary action and apply the action to the packet header (the action and the rule are typically concatenated in the same RAM entry). If the packet header is not found, the classifier will create a second hash value, using a second ERP, and access a different section in the RAM. This process may continue until a rule for the header is located. In an embodiment, the classifier accesses the ERPs of a first region in the first RAM access, and EPRs of an $n^{th}$ region in the $n^{th}$ access.

According to some embodiments, if the header is not located in the RAM, the classifier searches the entry in a TCAM, without hashing. According to some other embodiments, a TCAM is not used and, if the header is not located, the classifier requests a CPU to compute the required packet action. In some embodiments, the classifier may access a TCAM and, if the TCAM does not hold a rule for the header, access the CPU (or, the classifier may access both the CPU and the TCAM at the same time, for increased performance).

As would be evident, the performance of the classifier, measured in headers per second and/or packet latency, is significantly affected by the number of RAM accesses per average packet-header. Hence, if, for a given flow of packets, the ERPs of the first region contain packet headers that are more frequently received, the performance may be better.

According to embodiments of the present invention, when merging RPs to ERPs, the classifier aims to minimize the expectancy of the number of RAM cycles (that is, the sum of the probabilities to have n accesses per packet, multiplied by n).

In an embodiment, a counter is allocated to each of the RPs. The classifier increments the counter whenever the received packet header is contained in the RP (this event will be referred to as a match between the packet header and the RP, or "RP Hit"). According to some embodiments, when the classifier merges RPs to create ERPS and then allocates the ERPs to regions, the classifier reduces the expected number of RAM cycles, responsive to the contents of the counters (under the assumption that the nature of the traffic flow does not significantly change since the start of the counting period).

For example, the classifier may fit ERPs with the largest corresponding counts to the first RAM section, ERPs with the next largest counts in the second ERP RAM section, etc. The classifier writes the optimized regions in the RAM during a RAM Update period (RAM update may also be done incrementally).

As would be appreciated, the optimization process may compromise accuracy for fast operation and, hence, the merging of RPs to ERPs and the allocation of regions to ERPs will not necessarily reach the absolute minimum; however, the optimization will produce better performance when compared to optimizations that merely attempt to enlarge the number of the RPs that the ERPs contain.

Thus, in embodiments according to the present invention, the merging of RPs to ERPs is optimized for faster packet processing based on continuous RP-Hit counting rather than on static analysis of ERPs with the best coverage.

SYSTEM DESCRIPTION

FIG. 1 is a block diagram that schematically illustrates a network element 100, in accordance with embodiments of the present invention. The network element comprises Ingress Ports 102, which are configured to receive packets from a network such as Ethernet or InfiniBand (not shown); a Classifier 104, which is configured to classify the packets and determine actions which should be applied to the packets; a Packet-Handler 106, which is configured to apply the packet actions and to route the packets; Egress ports 108, which are configured to send packets over the network; and, a CPU 110, which is configured to govern and monitor the other units of the network element. As would be appreciated, FIG. 1 is a conceptual description of a network element, given merely as an example of the disclosed techniques. Units which may be essential for the functionality of network elements and would be apparent to those skilled in the art are omitted, for the sake of clarity.

Classifier 104 receives (typically from CPU 110) a corpus of rules to be applied on packets, according to bits in the packet headers. A rule typically comprises a sequence of "1", "0" and "X" symbols, wherein each symbol in the sequence corresponds to a bit of the packet header. A rule should be applied to a packet if the packet header bits match the corresponding rule sequence symbols, except that when a rule symbol is "x" a match is not required. For example, a 0111 packet header matches a 0XX1 and a XX11 rules, but dos not match a 0X01 rule (in practice, the number of rule symbols, which is equal to the number of packet-header bits, is considerably larger than the four bits of the example above).

A Rule-Pattern is the group of rules that share the same location of the X symbols. The non-X symbols (that is—the "1"s and "0"s) of the RP are typically denoted by a U; thus, the rules 0XXX and 1XXX share the same UXXX RP.

A group of RPs may be combined to a superset, which is referred to as Extended Rule Pattern (ERP), wherein the ERP includes an X symbol if, in any of the RPs of the group, the corresponding symbol is X, and U otherwise. For example, the ERP of RP1=UXUU, RP2=UXXU and RP3=UUUX, is UXXX.

Classifier 104 comprises a Hashing circuit 114, a RAM 116, a Search-Flow-Control Circuit (SFCC) 118, and an optional Ternary-Content-Addressable Memory (TCAM) 120. The RAM comprises a plurality of regions; each region comprises a plurality of groups of entries, each group of entries corresponding to a single ERP and storing up to eight entries corresponding to eight RPs. Each entry stores information for further RAM accesses, operable if the rule is not found in the current RAM access, and packet actions, operable if the rule is found (each entry may further comprise various indicators, such as a rule-found indicator).

As the number of X bits for each ERP is typically more than three (that is—more than 2^3=8 rules are typically defined for each ERP), a hashing table 114 reduces the X bits to three. The hashing function may change responsive to inputs from SFCC 118; in particular, if a rule for a current packet header is searched using multiple RAM accesses, the hashing function will change in each access, to point to different regions of RAM 116.

SFCC 118 is configured to govern the search for rules that correspond to the input packet header. When the classifier receives a packet, the SFCC controls Hashing circuit 114 to perform a hashing of the header that creates an entry in the first region in the RAM (where the first-region ERPs are stored). Thereafter, in response to the output from RAM 116, the SFCC either: i) if the rule is not found, controls the Hashing circuit to perform a hashing of the header that creates an entry in the next region in the RAM; or, ii) proceeds to the next packet, if a rule is found. Alternatively, the SFCC may access the optional TCAM 120, and/or request that CPU 110 will compute a rule for the current packet header (the rule that the TCAM stores and/or the rule that the CPU computes will typically be inserted in the RAM for faster accesses in further occurrences of the same header).

Classifier 104 further comprises Ram Access Counters 122, and ERP-Build circuit 124. RP-Hit Counters 122 comprise counters for all RPs. When a new packet header is received, Hashing Circuit 114 sends increment signals to the corresponding RP counters (e.g., to the RPs that are contained in the accessed ERP). RP-Hit Counters 122 will thus store, for each RP, the total number of packet header that fit the RP (referred to as "RP Hits"); when divided by the number of packets, this number represents the hit probability for the RP (for the flow of packets that was counted).

To follow changes in the characteristics of the packet flow over time, the classifier may periodically clear all counters. Alternatively, or additionally, the counters may be configured to gradually adapt for changes in the flow; for example, using an infinite-impulse-response (IIR) filtering to the RP-hit counts of new packets. Any other suitable gradual updating of the counts may be used in alternative embodiments.

ERP Build circuit 124 receives RP-Hit counts (one for every RP) from RP-Hit Counters 122, builds ERPs and allocates ERPs to RAM regions so as to minimize (or at least to reduce) the number of RAM access cycles for frequent packet headers. In some embodiments, ERP Build Circuit 124 directly writes the ERPs in the allocated RAM regions.

Theoretically, assuming the characteristics of the traffic in terms of cost per RP search are accurately represented by the RP-Hit counts, the ERP should build the ERPs and assign the ERPs to RAM regions in a way that minimizes the total cost function:

$$TCF = \sum_{rp=1}^{num(rp)} \sum_{region=1}^{num(regions)} ERPinRegion(rp, \text{region}) * Count(rp) * \text{region}$$

Wherein:
TCF is the Total Cost Function;
num(rp) is the number of RPs;
num(regions) is the number of regions;
ERPinRegion(rp,region) returns 1 if the ERP containing the RP is included in the current region; and
Count(rp) is the RP-Hit count for the current RP.

In some embodiments, to minimize the average search time per packet, the classifier orders all possible ERPs by the accumulated number of hits of the RPs that the ERP contains, then fits the top n ERPs (that is—the ERPs with largest aggregate number of counter values of the contained RPs) in a first RAM region (n is the number of ERPs that fit in a region); fits the next n ERPs in the next region, and so on.

As would be appreciated, complete minimization may consume too much time. In some embodiments, incomplete minimization is done; for example, the ERP Build Circuit may consider only the top 16 RP-Hit counts. In another example, the building of the ERPS and allocation of ERPs to regions is done incrementally by swapping between a low-count ERP located in a low (that is—requiring less RAM accesses) region and a higher-count ERP located in a higher region.

In some embodiments ERP Build Circuit 124 comprises one or more processors that execute an optimization software. In an embodiment, the ERP comprises dedicated optimization circuitry; in other embodiments a combination of processors and dedicated circuitry is used, and in yet other embodiments at least some of the optimization is done by CPU 110.

Thus, according to the example embodiment illustrated in FIG. 1 and described hereinabove, the cost associated with finding rules for packet headers is continuously monitored for each RP. Armed with this information, the classifier may improve the classification performance by building new ERPs and allocating the ERPs to RAM regions to minimize the search time of frequent packet headers.

As would be appreciated, network element 100 and classifier 104 described above are cited by way of example. Network elements and classifiers in accordance with the disclosed techniques are not limited to the description hereinabove. In alternative embodiments, for example, two or more classifiers may classify packets concurrently, each classifier classifying a subset of the ingress packets. In some embodiments, to decrease negative implications of the RAM update time (e.g., inconsistencies when only part of the RAM is updated), classifier 104 comprises two RAMS; when one RAM is updated, the other RAM is used for rule searching; when the update is complete, the two RAMS switch functions.

Figure 2A:
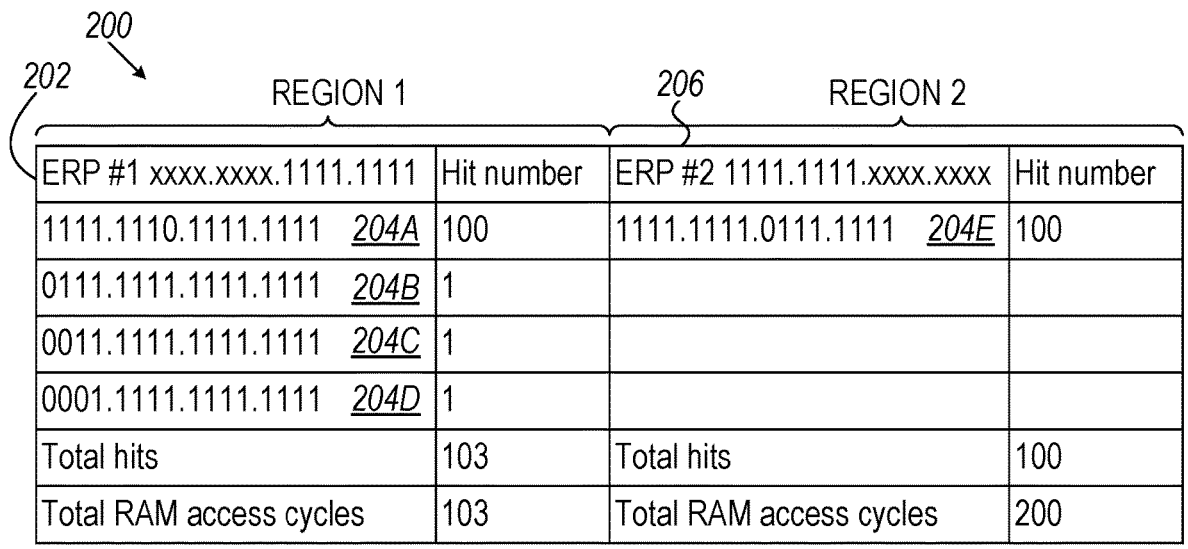
FIGS. 2A and 2B are a pair of tables that schematically illustrate classifier performance optimization by rebuilding ERPs and reallocating ERPs to RAM regions, in accordance with an embodiment of the present invention.
Figure 2B:
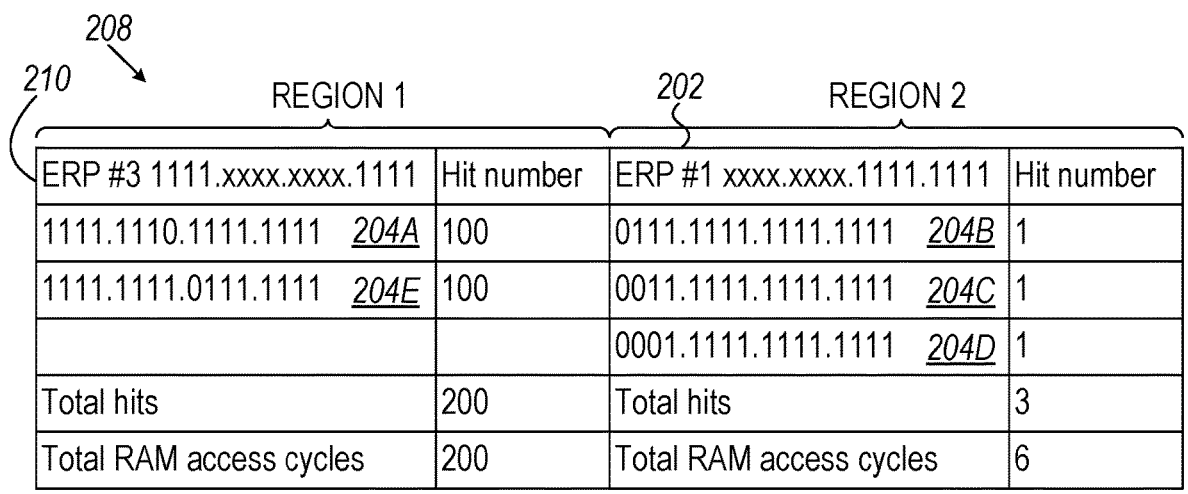

FIGS. 2A and 2B are a pair of tables that schematically illustrate classifier performance optimization by rebuilding ERPs and reallocating ERPs to RAM regions, in accordance with an embodiment of the present invention.

A Pre-optimization table 200 (FIG. 2A) illustrates ERP allocations before the optimization. An ERP #1 202 is stored in Region-1 and contains RPs 204 (204A through 204D). An ERP #2 206 is stored in Region 2 and contains an RP 204E. As can be seen, ERP #1 202 is built so as to contain the maximum number of RPs 204 (four out of five). ERP #1 is, therefore, assigned to region 1, whereas ERP #2 206, which contains only a single RP (204E), is assigned to region 2.

However, RP 204, contained in ERP #2 206 in region 2, is used 100 times, and, since accessing of region 2 takes two cycles, the total number of RAM accesses associated with RP 204E is large. The total number of hits for pre-optimization table 200 is 203, but the total number of RAM accesses is 303.

A Post-optimization table 208 (FIG. 2B) illustrates ERP allocations after an optimization according to an embodiment of the present invention. ERP Build Circuit 124 (FIG. 1) now builds an ERP#3 210, which covers RPs 204A and 204E only, allocates the ERP #3 in region 1, and moves ERP #1 to region 2.

While ERP #3 contains less RPs than ERP #1, performance is improved (due to the high frequency of RP 204E). The total number of RAM accesses is now 206.

Thus, by selecting an ERP that is not necessarily the one containing the largest number of RPs but, rather, one that contains frequently used RPs, and by placing the ERP in a low region (that is, a region that is accessed early and hence requires less RAM accesses), the dynamic average of packet classification cost (as measured in number of RAM accesses) can be reduced.

As would be appreciated, pre-optimization table 200 and post-optimization table 208 described above are cited by way of example. The number regions, ERPs and bits per RP/ERP are typically much larger than the numbers described in the example embodiment of FIGS. 2A and 2B.

Figure 3:
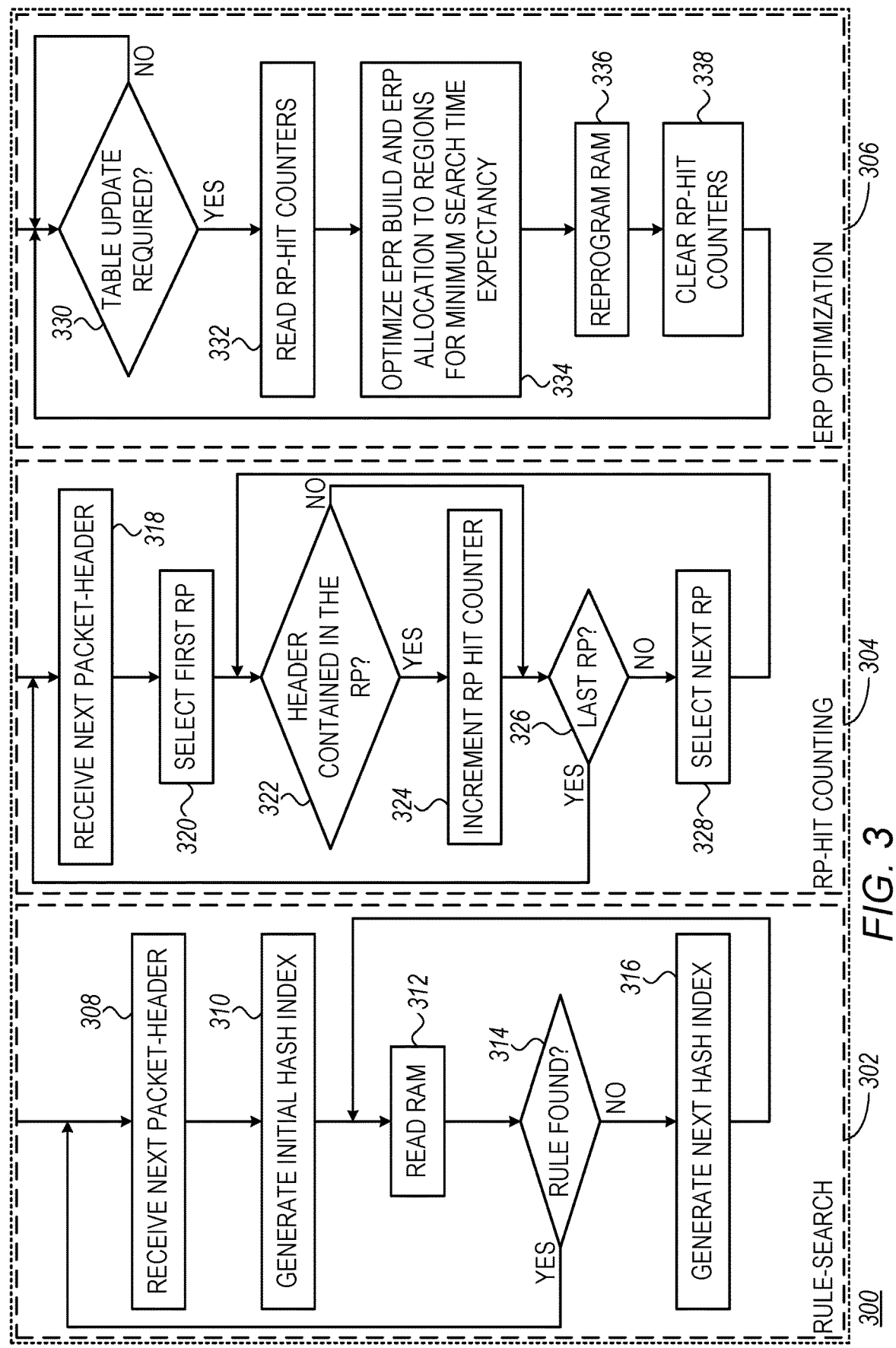
FIG. 3 is a flowchart that schematically illustrates a method for packet classification in accordance with the present invention.

FIG. 3 is a flowchart 300 that schematically illustrates a method for packet classification in accordance with the present invention. The flowchart is executed by classifier 104 (FIG. 1) and comprises three parallel flows—a Rule-Search flow 302, an RP-Hit Counting flow 304 and an ERP Optimization flow 306. Classifier units that will be referred to in the description herewith refer to units that are illustrated in FIG. 1.

Rule-Search Flow 302 starts at a Receive-Next-Header step 308, wherein the classifier received a packet header (the extraction of the header from the packet is typically done by a parser, which is not shown). Next, the classifier enters a Generate-Initial-Hash step 310 wherein Hashing 114 generates, responsive to the packet header and to control signals that are input from SFCC 118, an initial hash index, pointing to an entry in a first region in RAM 116.

After step 310 the classifier reads the RAM in a RAM-Read step 312, and, in a Rule-Found-Check step 314, checks if the data read from the RAM (in step 314) indicates that the rule has been found. If the rule has been found, the classifier sends the rule to Packet-Handler 106 and re-enters step 308, to classify the next packet.

If, in step 314, the rule is not found, the classifier enters a Generate-Next-Hash step 316, wherein Hashing 114 generates an index to access an entry in the next region of RAM 116, responsive to the packet header and to control signals that SFCC 118 generates (the control signals change between iterations of Rule-Search flow 302, to point to different regions of RAM 116). The Classifier then re-enters RAM-Read step 312 and starts another search iteration. The loop comprising steps 312, 314 and 316 continues until a rule is found, wherein the classifier re-enter step 308 and waits for the next packet.

Rule-Check flow 302 may comprise accesses to TCAM 120 and/or to CPU 110, which are not shown. The Classifier may access the TCAM and/or the CPU if the rule is not found in a preset number of iterations and/or if, in step 312, the classifier reads from RAM 116 an indication to access the TCAM/CPU.

Concurrently to Rule-Search Flow 302, the classifier (or, more precisely, RP-Hit Counters 122 of the classifier) executes RP-Hit-Counting flow 304. The flow starts at a Receive-Next-Header step 318, wherein the classifier received a packet header. The classifier then enters a Select-First-RP step 318 and selects the first RP from the group of all RPs. Next, the classifier enters a Check-Header-Contained step 322 and checks if the current header is contained in the current RP. If the header is contained in the RP, the classifier will enter an Incrementing-Counter step 324, increment the corresponding counter, and then proceed to a Checking-Last-RP step 326, whereas if the header is not contained in the RP, the classifier will enter step 326 directly (skipping step 324).

In step 326, the classifier checks if the current RP is the last RP; if so—the classifier will re-enter step 318 and wait for the next packet header. If the RP is not the last one, the classifier will enter a Selecting Next RP step 328, select the next RP and then re-enter step 318, to process the next packet-header.

As would be appreciated, flow 304 is a conceptual example only; in practical implementation the flow is executed concurrently for multiple counters or for all the counters.

The classifier also executes ERP optimization flow 306, concurrently with Rule-Search flow 302 and with RP-Hit Counting flow 304. Flow 306 is mainly executed by ERP Build Circuit 124. The flow starts with a Check-Update-Needed step 330, wherein the classifier checks if a RAM-Update is required (in fact, the classifier stays at step 330 until a new RAM update is required). RAM updates may be required to match the search algorithm for changing flow characteristics. RAM-update may be signaled, for example, by CPU 110, or by timers within or outside the classifier.

If an update is required, the classifier enters a Reading-Hit-Counts step 332 and reads the contents of RP-Hit Counters 122. Next, the classifier enters an Optimize-ERP-Build step 334, wherein the classifier runs an optimization algorithm, which groups RPs to ERPs and allocates ERPs to regions so as to optimize the expected search time for packet headers.

The processor next enters a Reprogram-RAM step 336 and reprograms RAM 116 with the new ERPs in the allocated regions. Lastly, the classifier enters a Clearing-Counters step 338, clears the RP-Hit counters and then re-enters step 330, waiting for the next RAM update.

In summary, according to the example embodiment illustrated in FIG. 3, packet classifier 104 executes three parallel flows—flow 302, which searches for rules by iteratively hashing into regions of RAM 116; flow 304, which increments counters corresponding to RPs that contain the packet headers; and, flow 306, which rebuilds ERPs and programs the ERPs into RAM regions, to optimize the expected rule search time. Rather than attempting to build best coverage ERPs, embodiments according to the present invention measure the RP utilization and optimize the ERP-Build accordingly, achieving better performance.

As would be appreciated, flows 302, 304 and 306 described above are cited by way of example. Network elements in accordance with the disclosed techniques are not limited to the description hereinabove. In alternative embodiments, for example, flow 302 comprises accessing a TCAM and/or requesting a CPU (e.g., CPU 110) to compute a rule. In an embodiment, rules that are read from the TCAM or computed by the CPU enter RAM 116, for faster searches of future occurrences of the current header. In some embodiments, flow 304 includes an aging mechanism, wherein old counts are gradually replaced by new counts, e.g., using IIR. Flow 306 may comprise complete or incremental optimization techniques, and, in some embodiments, may be executed in part or in full by CPU 110.

The configuration of Network element 100, including CPU 110, Classifier 104 and subunits thereof; the methods for rule searching, RP-Hit counting and ERP optimization, are example configurations and methods that are shown purely for the sake of conceptual clarity. Any other suitable configurations can be used in alternative embodiments.

In some embodiments, the network element further comprises a performance monitoring unit that monitors the performance of the classifier and may dynamically change parameters used by some or all the methods described herein.

In various embodiments, the various classifier tasks described hereinabove may be carried out by hardware, by software, or by combination of hardware and software.

In various embodiments, the different elements of Network Element 100, including Classifier 104 and sub-units thereof, may be implemented using suitable hardware, such as one or more Application-Specific Integrated Circuits (ASIC) or Field-Programmable Gate Arrays (FPGA), or a combination of ASIC and FPGA.

CPU 110 of Network Element 100 typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple ports, configured to transmit and receive packets over a network;
a packet classifier, configured to:
receive a corpus of rules and a plurality of Rule Patterns (RPs), wherein each RP corresponds to a subset of the rules and specifies positions of unmasked packet-header bits to be matched by the rules in the subset;
define, in a Random-Access Memory (RAM), multiple memory regions that are read sequentially one after another;
store, in the multiple memory regions, a first grouping of the RPs into Extended RPs (ERPs), each ERP defining a superset of the unmasked bits in the RPs associated therewith, and each ERP including multiple RPs;

receive packets, and match each packet to one or more of the rules by accessing the ERPs in the RAM;

estimate, for each RP from among at least some of the RPs, a respective number of the received packets that match the RP; and adaptively modify (i) the first grouping of the RPs into the ERPs responsive to the estimated numbers of received packets of the RPs and (ii) allocation of the ERPs to the memory regions, by:

building a new ERP from RPs having an estimated number of received packets that is greater than the estimated number of received packets of the ERPs in the first grouping;

forming a second grouping of the RPs into ERPs, which includes the new ERP;

sorting the ERPs of the second grouping according to accumulated numbers of the received packets that match the RPs in the ERP; and allocating subsets of the sorted ERPs, in descending order of the accumulated numbers of the received packets, to respective ones of the memory regions; and a packet handler, configured to apply actions to the packets depending on matching of the packets to the rules.

2. The network element according to claim 1, wherein, in performing a given modification of the grouping of the RPs, the packet classifier is configured to reduce an average number of times the RAM is read per packet.

3. The network element according to claim 1, wherein, in performing a given modification of the allocation of the ERPs to the memory regions, the packet classifier is configured to reduce an average number of times the RAM is read per packet.

4. The network element according to claim 1, further comprising a Ternary-Content-Addressable Memory (TCAM) that is configured to hold, at least temporarily, a subset of the rules, wherein the packet classifier is configured to match a received packet to the rules stored in the TCAM upon failing to find a successful match in the RAM.

5. The network element according to claim 1, wherein the packet classifier is configured to determine multiple counter values, wherein each counter value corresponds to a respective RP and is indicative of the respective number of the received packets that match the RP, and to adaptively modify the grouping of the RPs, and the allocation of the ERPs to the memory regions, depending on the counter values.

6. The network element according to claim 5, wherein the packet classifier is configured to increment the counter values in response to received packets that match the RPs corresponding to the counter values, and to modify the grouping of the RPs into the ERPs based on the incremented counter values.

7. The network element according to claim 5, wherein the packet classifier is configured to modify the grouping of the RPs by finding, for a given region of the RAM, an RP grouping that corresponds to a highest aggregate number of the counter values and still fits within the given region.

8. The network element according to claim 5, wherein the packet classifier is configured to periodically reset the multiple counter values.

9. The network element according to claim 5, wherein, in adaptively modifying the allocation of the ERPs to the memory regions, the packet classifier is configured to move a given ERP from one of the memory regions to another of the memory regions based on at least some of the counter values.

10. A method, comprising:

in a network element that transmits and receives packets over a network, receiving a corpus of rules and a plurality of Rule Patterns (RPs), wherein each RP corresponds to a subset of the rules and specifies positions of unmasked packet-header bits to be matched by the rules in the subset;

defining, in a Random-Access Memory (RAM), multiple memory regions that are read sequentially one after another;

storing, in the multiple memory regions, a first grouping of the RPs into Extended RPs (ERPs), each ERP defining a superset of the unmasked bits in the RPs associated therewith, and each ERP including multiple RPs;

receiving packets, and matching each packet to one or more of the rules by accessing the ERPs in the RAM;

estimating, for each RP from among at least some of the RPs, a respective number of the received packets that match the RP;

adaptively modifying (i) the first grouping of the RPs into the ERPs responsive to the estimated numbers of received packets of the RPs and (ii) allocation of the ERPs to the memory regions, by:

building a new ERP from RPs having an estimated number of received packets that is greater than the estimated number of received packets of the ERPs in the first grouping;

forming a second grouping of the RPs into ERPs, which includes the new ERP;

sorting the ERPs of the second grouping according to accumulated numbers of the received packets that match the RPs in the ERP; and allocating subsets of the sorted ERPs, in descending order of the accumulated numbers of the received packets, to respective ones of the memory regions; and applying actions to the packets depending on matching of the packets to the rules.

11. The method according to claim 10, wherein performing a given modification of the grouping of the RPs comprises reducing an average number of times the RAM is read per packet.

12. The method according to claim 10, wherein performing a given modification of the allocation of the ERPs to the memory regions comprises reducing an average number of times the RAM is read per packet.

13. The method according to claim 10, further comprising storing in a Ternary-Content-Addressable Memory (TCAM), at least temporarily, a subset of the rules, and matching a received packet to the rules stored in the TCAM upon failing to find a successful match in the RAM.

14. The method according to claim 10, wherein adaptively modifying the grouping of the RPs, and the allocation of the ERPs to the memory regions, comprises determining multiple counter values, wherein each counter value corresponds to a respective RP and is indicative of the respective number of the received packets that match the RP, and adaptively modifying the grouping of the RPs, and the allocation of the ERPs to the memory regions, depending on the counter values.

15. The method according to claim 14, wherein determining the counter values comprises incrementing the counter values in response to received packets that match the RPs corresponding to the counter values, and wherein modifying the grouping comprises modifying the grouping of the RPs into the ERPs based on the incremented counter values.

16. The method according to claim 14, wherein modifying the grouping comprises finding, for a given region of the RAM, an RP grouping that corresponds to a highest aggregate number of the counter values and still fits within the given region.

17. The method according to claim 14, wherein determining the counter values comprises periodically resetting the multiple counter values.

18. The method according to claim 14, wherein adaptively modifying the allocation of the ERPs to the memory regions comprises moving a given ERP from one of the memory regions to another of the memory regions based on at least some of the counter values.

\* \* \* \* \*